Patented Nov. 13, 1928.

1,691,460

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

COMPOSITION OF GUM CHICLE, RUBBER, AND AN AQUEOUS COLLOID.

No Drawing.    Application filed May 22, 1926.    Serial No 111,027.

My invention relates to a composition of matter having adhesive properties and comprising gum chicle and rubber dispersed in an aqueous colloid.

An object of my invention is to produce a composition useful in the arts having the waterproof qualities of rubber but preferably not having the stretchiness or elasticity thereof which is undesirable or disadvantageous in many instances.

My new composition is especially adaptable for use as a seal for metallic, glass or other containers, the adhesiveness of the composition enabling it to adhere to metallic, glass or other like surfaces with great tenacity. My composition is also useful for coating and impregnating fabrics, paper and the like and also as a binder for fibrous materials and comminuted substances such as leather, cork and wood. By the addition of suitable filling materials the composition may be made of a plastic or moldable nature and of utility in the plastic and molding arts. The composition will also be found adaptable for advantageous use in numerous other industries and arts.

The gum chicle may be used either in its crude or refined states as may also the rubber by dissolving it in an organic solvent or dispersing it in aqueous colloidal form or it may be used in its original form as contained in latex, preferably preserved with an alkali. The initial physical condition of the rubber is not of great importance as long as the rubber is in some form of aqueous dispersion in the product, as its essential utility resides in the elasticity, comparatively small, which it imparts to the composition. Among the colloids which may be used in the composition are casein, starches, especially thin flowing or modified starches, soluble silicates and resinates, soaps, insoluble stearates and colloidal clays.

In carrying out my invention, I first disperse the gum chicle in water or an aqueous colloid; this may be done by any suitable means as by grinding, rolling or spraying the gum chicle in water or an aqueous colloid, with or without heat, or the gum chicle may be first dissolved in an oil solvent such as linseed oil, heat preferably being present. It will be understood that other oils which are chicle solvents or organic solvents may be also used. When heavy or semi-drying or oxidizing oils are used they will be contained in the finished product, which is sometimes desirable. When, however, it is not desired that the oil shall be in the finished product, a volatile organic solvent may be used to dissolve the chicle, and this mixture dispersed in the aqueous colloid. The solvent may then be removed by evaporation while still in colloidal form or during the process of drying the finished article.

As an example of one form of my new composition, I take 80 parts by weight of gum chicle and dissolve it in 60 parts of linseed oil with the aid of heat. I also take 25 parts by weight of casein and dissolve the same in a solution of 150 parts of water and 7 parts of a casein solvent, for example, 2 parts of borax and 5 parts of aqua ammonia. The dissolving of the casein may be assisted by heat. The oil solution of chicle may be then slowly added to the casein solution under agitation. Care should be observed that the dispersion of the gum chicle in the aqueous colloid is complete for otherwise an inversion of phase may take place and form a stringy or tacky mass. The composition at this stage should now be more or less viscous or plastic. 100 parts by weight of rubber are now added to the composition; the rubber may be in the form of rubber latex which has been treated with ammonia to make it alkaline. The composition is then subjected to a vigorous stirring so that the parts may become thoroughly commingled and the rubber and gum chicle uniformly dispersed throughout. It will be understood that dispersed rubber in other forms, crude, refined, vulcanized, reclaimed or uncured, may be employed instead of as found in rubber latex.

The foregoing composition has been found admirably suited for use as a sealing compound for metal, glass, paper and other containers, no vulcanizing or accelerating agent being essential. When, however, the composition is to be used for coating or impregnating articles such as paper, fibres, fabrics, textiles and the like or as a binder for comminuted materials such as cork, leather, and sawdust, vulcanizing and accelerating agents may be added; among the vulcanizing agents which may be used are sulphur, colloidal sulphur, soluble sulphites or sulphides or other sulphur compounds. The sulphur chloride cure or other cold cure may also be employed. Accelerating agents may be advantageously employed in some instances;

accelerating agents which I have found very adaptable are formaldehyde or compounds capable of forming formaldehyde in situ.

If the product is to be used in the plastic or molding arts, fillers, such as clay, zinc oxides and lamp black, among others, may be added to the composition, the degree of plasticity or moldability being governed by the amount of water which may be added. If a composition more or less brittle is desired the proportions of the colloid and filling materials may be increased and a vulcanizing agent may be added when it is desirable that the composition be vulcanized. If a more or less soft and inelastic composition is desired the proportions of the gum chicle, oil and the various softening agents may be increased. If it is desirable that the composition be of a somewhat high degree of elasticity, then the proportions of the rubber content may be increased. Furthermore, the order of mixing or adding the ingredients may be varied; for instance, the rubber may be dispersed at the same time with the chicle or it may be dispersed in the aqueous colloid before the addition of the chicle.

While I have herein described a mode of carrying out my invention and its utility in some of the arts, it is to be understood that the invention is not limited to those arts or to the particular mode described or to the particular ingredients and proportions mentioned.

Having thus described my invention, I claim and desire to protect by Letters Patent of the United States:

1. A composition of matter having adhesive properties comprising an aqueous dispersion of gum chicle, rubber and a hydrophilic colloid.

2. A composition of matter having adhesive properties comprising an aqueous dispersion of gum chicle, an oil solvent for said gum chicle, rubber, and a hydrophilic colloid.

3. A composition of matter having adhesive properties comprising an aqueous dispersion of gum chicle, linseed oil, rubber, and a hydrophilic colloid.

4. A composition of matter having adhesive properties comprising an aqueous dispersion of gum chicle, a hydrophilic colloid and rubber in a colloidal state.

5. A composition of matter having adhesive properties comprising an aqueous dispersion of gum chicle, casein and rubber latex.

6. A composition of matter having adhesive properties comprising an aqueous dispersion of gum chicle, rubber latex, linseed oil, and casein.

7. A composition of matter having adhesive properties comprising an aqueous dispersion of chicle a hydrophilic colloidal substance, an oil solvent for said chicle, rubber in dispersed phase.

8. A composition of matter having adhesive properties comprising an aqueous dispersion of chicle a hydrophilic colloidal substance, an oil solvent for said chicle, rubber in dispersed phase, and an alkali.

In witness whereof, I have hereunto set my hand this 21st day of May, 1926.

ARTHUR BIDDLE.